May 12, 1964   K. R. BROOKS   3,132,366
WINDSHIELD WIPER SYSTEM
Filed Dec. 13, 1962   3 Sheets-Sheet 1

KENNETH R. BROOKS
INVENTOR

BY John R. Faulkner
Stuart Lubitz
ATTORNEYS

May 12, 1964

K. R. BROOKS 3,132,366

WINDSHIELD WIPER SYSTEM

Filed Dec. 13, 1962

KENNETH R. BROOKS
INVENTOR

BY John L. Faulkner
   Stuart Lubitz

ATTORNEYS

United States Patent Office 3,132,366
Patented May 12, 1964

3,132,366
WINDSHIELD WIPER SYSTEM
Kenneth R. Brooks, Dexter, Mich., assignor to Ford Motor Company, Dearborn, Mich., a corporation of Delaware
Filed Dec. 13, 1962, Ser. No. 244,353
7 Claims. (Cl. 15—250.17)

This invention relates to a windshield wiper system. More particularly the invention relates to an improved construction for parking the windshield wiper blades adjacent to the weatherstrip that runs along the cowl of an automotive vehicle.

In parking the wiper blades it is desirable that the blades lie as close as possible to the weatherstrip so that they do not interfere with the operator's vision. There are several factors which influence the parking of the wiper blades. These factors include the flexibility of the wiper blades and the associated linkage, the frictional forces exerted on the blade, the position of the blades when the motor which drives the blades is turned off and the design of the motor. One aspect of the applicant's invention is directed to combining the windshield wiper linkage and blades with a more effective motor design. Another aspect of the invention relates to an improved and simplified means for turning off the motor when the windshield wiper blades have reached a given position.

The improved motor design of the invention utilizes a novel means for dynamically braking windshield wiper blades. It has been well known in the art to brake the movement of the wiper blades by terminating the flow of current to the armature of a field wound motor. This termination of the current will generally de-energize the field and consequently reduce the magnitude of the dynamic braking forces and consequently the dynamic braking is not entirely effective. Some prior art improvements suggest that the field might continue to be energized after the supply of current to the armature has been terminated by the addition of some type of time delay circuitry. This modification would, of course, result in a strong magnetic braking force but it also would result in a relatively complicated and expensive circuit arrangement. Other prior art attempts have tried to compromise the two above-mentioned designs by utilizing a low resistance shunted field which would carry a high current during deceleration. This type of system, besides only developing a partial dynamic braking force, draws an excessive current during normal operation.

Applicant proposes to avoid all of these disadvantages by utilizing a permanent magnet motor. Such a motor develops a full dynamic braking force independent of any field current. The use of such a motor also simplifies the necessary control circuitry for terminating the operation of the motor. The circuitry is so simplified that it may be attached directly to the brush card of the motor.

The general object of this invention is to provide an improved windshield wiper system.

Another object of this invention is to provide an improved means for parking the wiper blades of a windshield wiper system.

Another object of this invention is to provide an improved means for controlling the termination of the operation of the motor.

Another object of this invention is to provide an improved means for dynamically braking and parking the windshield wiper blades.

Other objects and advantages of this invention will become apparent as the specification is read in conjunction with the drawings wherein.

Figure 1:
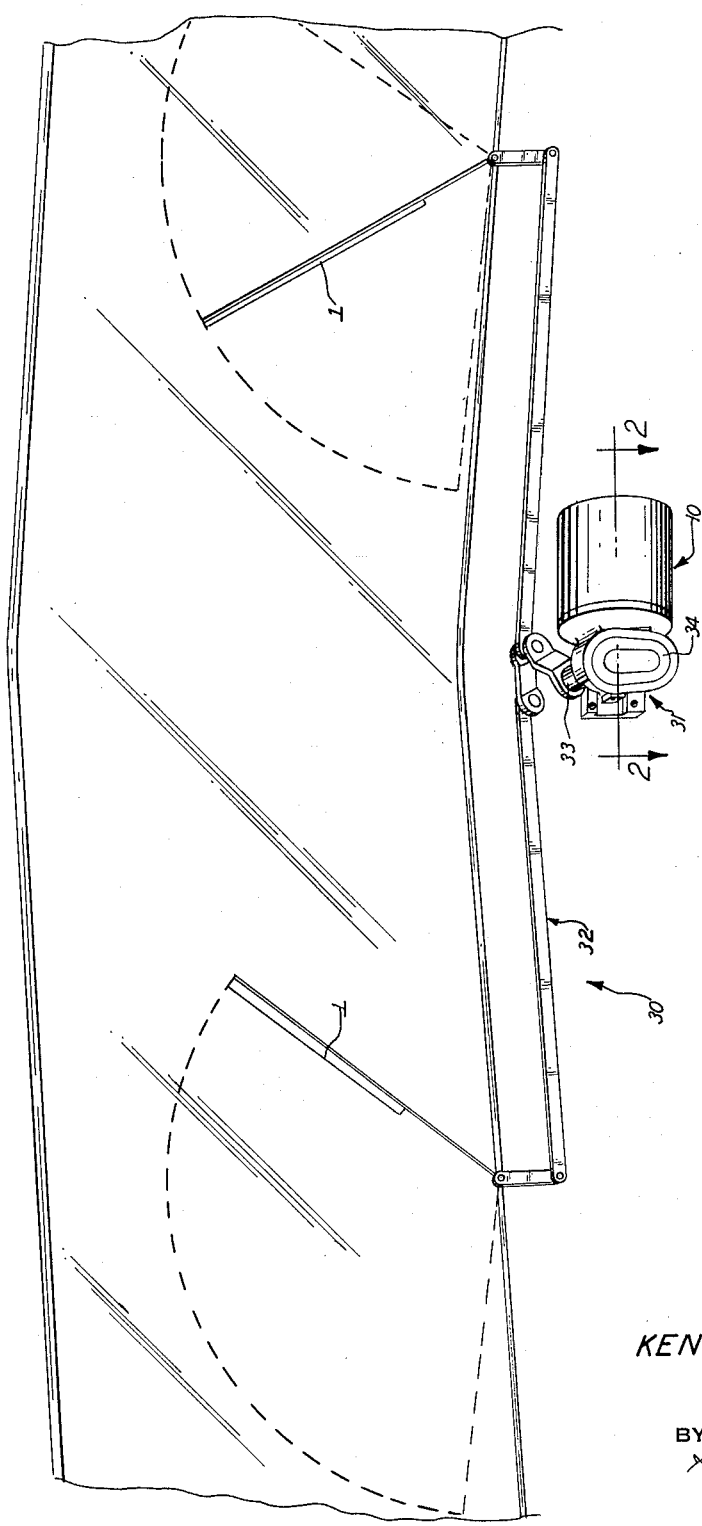
FIGURE 1 is a perspective diagram of the windshield wiper system.

Referring to FIGURE 1, the windshield wiper system includes the drive means or motor 10 which is connected to the wiper blades 1 by the drive coupling means 30. The drive coupling means 30 includes a gear train 31 contained in the gear train housing 34 and a linkage means 32 which is connected to the output shaft 33 of the gear train 31. Linkage means such as the linkage means 32 are quite commonly known and any such means may be used with the instant invention such as that disclosed in U.S. Patent 2,332,123 issued to J. B. Whitted on October 19, 1943.

Figure 2:
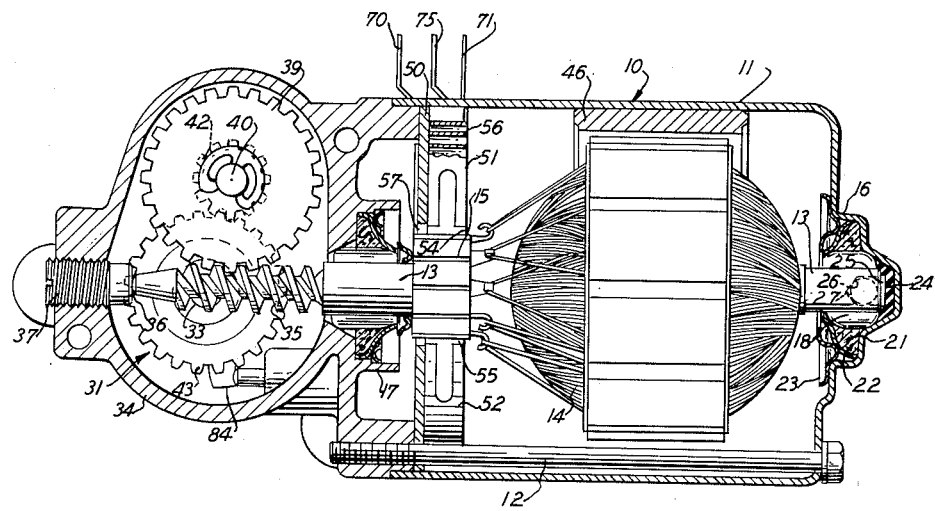
FIGURE 2 is a sectional view along the lines 2—2 of FIGURE 1 and showing the motor and a portion of the drive coupling means.

The drive means or motor 10 shown in FIGURE 2, which may be a single or multiple speed fractional horsepower commutator type motor, has a housing 11 that is rigidly attached to the gear train housing 34 by a pair of bolts, one of which is shown at 12. A conventional rotor assembly comprising a shaft 13, an armature 14, and a commutator 15 is rotatably mounted within the housing 11 by means of a pair of bearings which are positioned into the recessed end portions 16 and 17 of the housings 11 and 34 respectively. Each of these bearings may comprise a sleeve 18 of porous material which rotatably supports the shaft 13. A lubricant impregnated packing 21 surrounds the sleeve 18 to lubricate the shaft 13. Each of the sleeves may be retained within the recesses 16 and 17 in the housings by suitable means, for example, an annular spring 22 which engages the sleeve 18 and the packing 21 and a spring retainer 23 fixed to the housing 11 by any suitable means, such as a spot weld. Any axial thrust transmitted to the shaft 13 may be absorbed by an elastomer 24 embedded in the end portion of the recess 16 and having a disc 25 embedded therein which abuts a ball bearing 26. The ball bearing 26 is received by a hole 27 in the end of the shaft 13 and is in rolling contact with the disc 25.

At the other end of the armature shaft 13 is a worm gear portion 35 that extends into the gear train housing 34 and forms part of the gear train 31. The worm gear portion 35 has a round end 36 that abuts the end play adjusting set screw 37 which threadedly engages the gear train housing 34. A nylon gear 39, which meshingly engages the worm gear 35, is fixed on the shaft 40 that is rotatably journaled in the gear train housing 34. A sintered iron gear 42 is integrally molded on one side of the nylon gear 39 and meshingly engages the output pinion 43 which is mounted on the output shaft 33. The output shaft 33 also has a cam 45 (FIGURE 3) fixed thereto which may be considered part of the coupling means 30 or part of the switch actuating means 80, described later in the specification.

Surrounding the armature 14 is a pair of permanent field magnets, one of which is shown at 46. The permanent magnets, preferably composed of barium ferrite and having the chemical formula $BaO \cdot 6Fe_2O_3$, may be mounted in the housing 11 by means of a pair of spring clips (not shown). A typical mounting arrangement is shown in copending U.S. patent application S.N. 783,353, now Patent No. 3,090,877, assigned to the assignee of the instant application.

Figure 4:
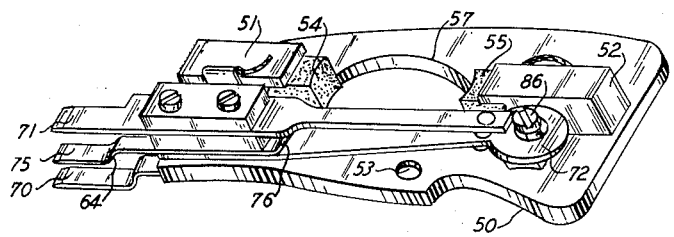
FIGURE 4 is a perspective view of the brush card and the attached switch means.

A sheet of rigid insulating material or brush card 50 having receptacles 51 and 52 attached thereto by means of tabs (not shown) is mounted against the end of the housing 34. The brush card 50 is maintained in a fixed axial position by a fastening means such as a screw or rivet that may be inserted in the aperture 53 in the brush card 50 and fixed to the housing 34 (FIGURE 4). There are many alternate means for securing the brush card in an axial position such as by placing a fastening means on the bolt member 12 or by staking the insulating material to the housing 11 or 34 by appropriate protrusions placed on the housings. A pair of brushes 54 and 55 are positioned within the receptacles 51 and 52 and are urged against the commutator 15 by springs, one of which is shown at 56.

Figure 3:
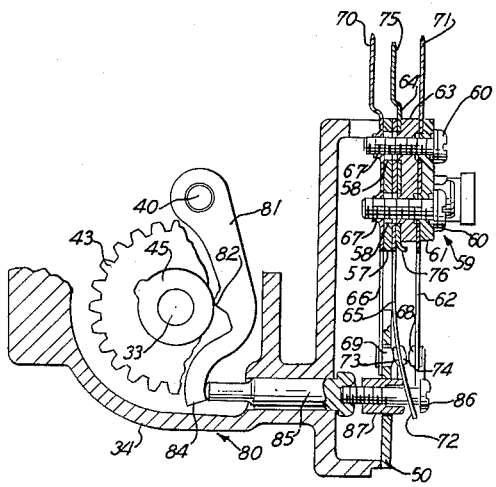
FIGURE 3 is a partial section of the motor showing the brush card and the control circuit means.

As clearly shown in FIGURES 3 and 4, the brush card 50 has an aperture 57 for receiving the commutator 15 and a plurality of apertures 58 for receiving a switch member 59. The switch member 59 has a plurality of fastening means 60 that pass through an insulating block 61, a first switch arm 62, a second insulating block 63, a conductor 64, a second switch arm 65, the apertures 58 in the brush card 50 and a third switch arm 66. The fastening means 60 is secured to the third switch arm 66 by a plurality of apertures 67 therein having dished edges that contact the threaded portion of the fastening means 60. The switch arms 62 and 65 and the conductor 64 do not contact the fastening means 60, and the switch arms 62, 65 and 66 are separated from one another by the insulating block 63 and the brush card 50. The switch arms 62 and 66 have single contacts 68 and 69 at one end with the plug portions 70 and 71 at the other end. The second switch arm 65 has an oval-shaped end 72 with an aperture therein for receiving a portion of the switch actuating means 80 described later in the specification. Adjacent the oval-shaped end 72, the second switch arm 65 carries a plurality of contacts 73 and 74. The contact 73 is normally abutting the contact 69 on the third switch arm 66 to comprise a pair of normally closed contacts. The second switch arm 65 may be moved by the switch actuating means 80 so that the contact 74 is in abutting relationship with the contact 68 on the first switch arm 62. The contacts 69 and 73 may be, therefore, considered a pair of normally open contacts. The conductor 64 has its surface in contact with the second switch arm 65 and has a plug portion 75 at one end and a formed portion 76 at its other end. The formed end 76 is adapted to be attached to a conductor 77 which is connected to the armature of the motor 10 via the brushes 54 and 55 and the commutator 15.

The switch 59 is operated by the switch actuating means 80 which includes a switch actuating lever 81 which is pivotally mounted on the shaft 40. The switch actuating lever 81 has a follower portion 82 which rides along the surface of the cam 45 and an end portion 84 which engages a nylon push rod 85. The push rod 85 is slidably mounted in the gear train housing 34 and has a park switch adjusting screw 86 attached to one end. The parking switch adjusting screw 86 has a bushing 87 made of insulating material which surrounds part of its body. Bushing 87 abuts the second switch arm 65 so that each time the output shaft 33 rotates through one revolution, the cam 45 will move the switch actuating lever 81 causing the end portion 84 to move the push rod 85 resulting in the bushing 87 opening the normally closed contacts 69 and 73 and closing the normally opened contacts 68 and 74.

Figure 5:
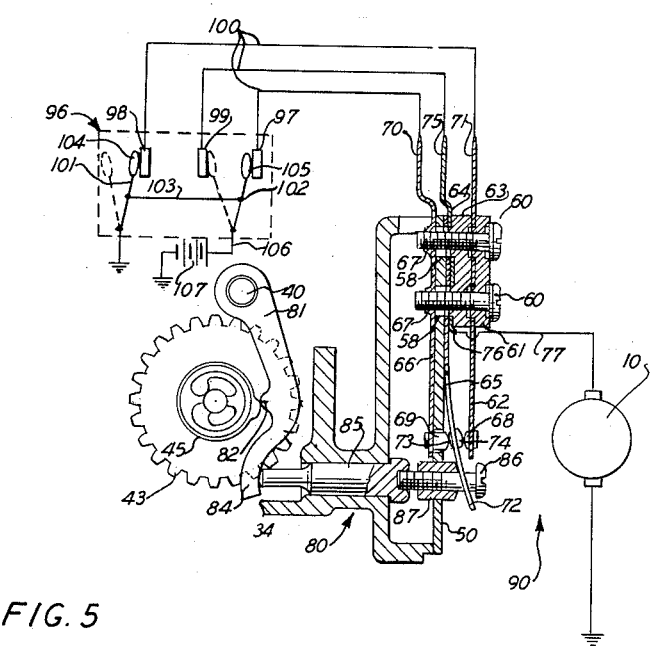
FIGURE 5 is a schematic diagram of the control circuit means.

The control circuit means 90 for terminating the operation of the motor 10 is schematically shown in FIGURE 5. The control circuit means 90 comprises the switch 59 and the switch actuating means 80, described above, and the dashboard control switch 96. The plug portions 70, 71 and 75 of the switch 59 are connected to the contacts 97, 98 and 99 respectively of the dashboard control switch 96 by the conductors 100. The dashboard control switch has a pair of switch arms 101 and 102 which are mechanically linked to move as a unit as indicated by the line 103. The switch arms 101 and 102 have contacts 104 and 105 at one end and are pivotally mounted at the other end. The switch arm 102 is electrically connected by the conductor 106 to a voltage source 107 which is in turn connected to ground. The contacts 104 and 105 will abut the contacts 98 and 97 respectively when the dashboard control switch 96 is in a "park" position. When the switch 96 is adjusted to a "run" position, indicated by the broken lines in FIGURE 5, the contact 105 will abut the contact 97 and the contact 104 will be in an open position.

In operation, assuming the dashboard control switch 96 to be in a "run" position, a circuit will be completed from the voltage source 107 to the armature of the motor 10 via the conductor 106, the switch arm 102, the contacts 99 and 105, the conductor 100, the plug portion 75, the conductor 64 and the conductor 77. It is apparent that the periodic opening and closing of the contacts 69 and 73 by the switch actuating means 80 does not interfere with the energization of the motor 10. It is only when the dashboard control switch 96 is placed in a "park" position and a circuit is completed to the motor 10 via the conductor 106, the switch arm 102, the contacts 97 and 105, the conductor 100, the plug portion 70, the third switch arm 66, the contacts 69 and 73, the second switch arm 65, the conductor 64 and the conductor 77 that the operation of the switch actuating means 80 will terminate the energization and the movement of the motor 10. When the above circuit is completed the movement of the push rod 85 by the cam operated switch actuating lever 81 will open contacts 69 and 73, close the contacts 68 and 74, thus terminating the flow of current to the armature 14 and connecting the armature 14 to ground. With the armature 14 connected to ground a large magnetic braking force is created as the only resistance to any induced currents is that resistance caused by the armature. From this it is apparent that the field magnet 46 cooperates with the armature 14 to dynamically brake the rotation of the armature 14 and consequently stop the rotation of the output shaft 33 and the movement of the wiper blades 1 across the windshield.

A visual inspection of FIGURE 5 indicates that the control circuitry of the instant invention is quite simple. As a matter of fact, there are only five conductors connecting the dashboard control switch 96, the switch 59, the voltage source 107 and the motor 10. This simplified circuitry can largely be attributed to the use of a permanent magnet motor. In addition to the simplified circuitry, the permanent magnet motor has the advantage of exerting a large braking force upon the armature 14 and consequently improves the parking operation of the windshield wiper system by bringing the blades to virtually an immediate halt.

It will be understood that the invention is not to be limited to the exact construction shown and described, but that various changes and modifications may be made without departing from the spirit and scope of the invention, as defined in the appended claims.

I claim:

1. In a windshield wiper system the combination comprising a plurality of windshield wiper blades, a motor having a housing, a shaft rotatably mounted in said housing, an armature mounted on said shaft, a commutator mounted on said shaft, a brush card located adjacent said commutator in said housing and having brushes mounted thereon and in contact with said commutator, a field means consisting of permanent magnets, coupling means for connecting said shaft and said wiper blades and a control circuit means located on said brush card for de-energizing said armature when said windshield wiper blade reaches a given point on the windshield.

2. In a windshield wiper system the combination comprising a plurality of windshield wiper blades, a motor having a housing, a shaft rotatably mounted in said housing, an armature mounted on said shaft, a commutator mounted on said shaft, a brush card located adjacent said commutator in said housing and having brushes mounted thereon and in contact with said commutator, a field means consisting of permanent magnets, coupling means for connecting said shaft and said wiper blades and a control circuit means located on said brush card for grounding said armature when said windshield wiper blade reaches a given point on the windshield.

3. In a windshield wiper system the combination comprising a plurality of windshield wiper blades, a voltage source, a motor having a housing, a shaft rotatably mounted in said housing, an armature mounted on said shaft, a commutator mounted on said shaft and electrically connected to said armature, a brush card located adjacent said commutator in said housing and having brushes mounted thereon and in contact with said commutator, said voltage source in circuit with said brushes, a field structure consisting of permanent magnets, coupling means for connecting said shaft and said wiper blades and a control circuit means located on said brush card for interrupting the circuit connection between said voltage source and said brushes when said windshield wiper blade reaches a given point on the windshield, said control circuit means operatively coupled to said coupling means and in circuit with said brushes and said voltage source.

4. In a windshield wiper system the combination comprising a plurality of windshield wiper blades, a voltage source, a motor having a housing, a shaft rotatably mounted in said housing, an armature mounted on said shaft, a commutator mounted on said shaft and electrically coupled to said armature, a brush card located adjacent said commutator in said housing and having brushes mounted thereon and in contact with said commutator, a field structure consisting of permanent magnets surrounding said armature; a coupling means for connecting said shaft and said wiper blades, said coupling means including a cam and a control circuit means for de-energizing said armature when said windshield wiper blades reach a given point on the windshield, said control circuit means comprising a switch mounted on said brush card having a pair of normally closed contacts, said contacts in circuit with said brushes and said voltage source, a switch actuating means for opening said normally closed contacts, said switch actuating means located adjacent said switch and in contact with said cam of said coupling means, said cam adapted to move said switch actuating means to open said switch.

5. In a windshield wiper system the combination comprising a plurality of windshield wiper blades, a voltage source, a motor having a housing, a shaft rotatably mounted in said housing, an armature mounted on said shaft, a commutator mounted on said shaft and electrically connected to said armature, a brush card located adjacent said commutator in said housing and having brushes mounted thereon and in contact with said commutator, a field structure consisting of permanent magnets surrounding said armature, coupling means for connecting said shaft and said wiper blades, said coupling means including a cam, and a control circuit means for de-energizing said armature when said windshield wiper blades reach a given point on the windshield, said control circuit means comprising a switch mounted on said brush card having a pair of normally closed contacts, said contacts in circuit with said brushes and said voltage source, a switch actuating means for opening said normally closed contacts, said switch actuating means including a switch actuating lever having a cam follower which contacts said cam and an end portion, a slidably mounted push rod which contacts said end portion and switch, said cam adapted to move said switch actuating lever to slide said push rod to open said normally closed contacts.

6. In a windshield wiper system the combination comprising a plurality of windshield wiper blades, a voltage source, a motor having a housing, a shaft rotatably mounted in said housing, an armature mounted on said shaft, a commutator mounted on said shaft and electrically connected to said armature, a brush card located adjacent said commutator in said housing and having brushes mounted thereon and in contact with said commutator, a field structure consisting of permanent magnets surrounding said armature, coupling means for connecting said shaft and said wiper blades, said coupling means including a cam, and a control circuit means for de-energizing said armature when said windshield wiper blade reaches a given point on the windshield, said control circuit means comprising a switch located on said brush card and having a pair of normally closed contacts and a pair of normally open contacts, a conductor connecting one of said normally closed contacts and one of said normally open contacts to said brushes, a dashboard control switch having a plurality of contacts, a first of said contacts connected to the other of said normally closed contacts, a second of said contacts connected to said conductor that is connected to said normally closed contact and said normally open contact, a third of said contacts connected to the other of said normally open contacts, said dashboard control switch having a plurality of switch arms, one of said switch arms connected to said voltage source and another of said switch arms connected to ground, said switch arms coupled to move as a unit and assume a park position or a run position, in said park position said switch arm connected to said voltage source abutting said first contact and when in said run position abutting said second contact, said other switch arm abutting said third contact when in a park position and open when in said run position, a switch actuating means for opening said normally closed contacts and closing said normally open contacts, said switch actuating means located adjacent said switch and in contact with said cam of said coupling means, said cam adapted to move said switch actuating means to open said normally closed contacts and close said normally open contacts.

7. In a windshield wiper system, the combination comprising a motor which includes a permanent magnet field, a rotatably mounted shaft and an armature mounted on said shaft, a brush card, electrical contact brushes carried by said brush card and adapted to energize said armature, a plurality of windshield wiper blades operatively coupled to said shaft of said motor, a drive coupling for connecting said shaft to said wiper blades and a circuit means for de-energizing said armature when said windshield wiper blades reach a given point on the windshield, said circuit means in circuit with said armature and operatively coupled to said drive coupling means, said circuit means mounted on said brush card.

References Cited in the file of this patent

UNITED STATES PATENTS 2,364,603     Coxon et al. _____ Dec. 12, 1944

FOREIGN PATENTS 1,148,787     France _____ July 1, 1957